(12) United States Patent
Adkins

(10) Patent No.: US 12,182,783 B2
(45) Date of Patent: Dec. 31, 2024

(54) ADAPTIVE DAILY WITHDRAWAL LIMITS FOR SMART CHIP ATM TRANSACTIONS

(71) Applicant: Wells Fargo Bank, N.A., San Francisco, CA (US)

(72) Inventor: James Adkins, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/132,839

(22) Filed: Apr. 10, 2023

(65) Prior Publication Data

US 2023/0245084 A1    Aug. 3, 2023

Related U.S. Application Data

(63) Continuation of application No. 15/818,544, filed on Nov. 20, 2017, now Pat. No. 11,625,699.

(60) Provisional application No. 62/439,309, filed on Dec. 27, 2016.

(51) Int. Cl.
*G06Q 20/10* (2012.01)
*G06Q 20/34* (2012.01)

(52) U.S. Cl.
CPC ....... *G06Q 20/1085* (2013.01); *G06Q 20/341* (2013.01)

(58) Field of Classification Search
CPC .......................... G06Q 20/1085; G06Q 20/341
See application file for complete search history.

(56) References Cited

U.S. PATENT DOCUMENTS

| 4,186,871 | A | 2/1980 | Anderson et al. |
| 5,581,445 | A | 12/1996 | Horejs et al. |
| 6,068,184 | A | 5/2000 | Barnett |
| 6,272,475 | B1 | 8/2001 | Nolte et al. |
| 7,904,946 | B1 | 3/2011 | Chu et al. |
| 7,966,255 | B2 | 6/2011 | Wong et al. |
| 8,069,084 | B2 | 11/2011 | Mackouse |
| 8,296,204 | B2 * | 10/2012 | Templeton ......... G06Q 20/4016 705/40 |
| 8,468,584 | B1 | 6/2013 | Hansen |
| 8,690,054 | B1 | 4/2014 | Cummins et al. |

(Continued)

FOREIGN PATENT DOCUMENTS

WO    WO-2014107336 A1 *   7/2014    ........... G06Q 20/401

OTHER PUBLICATIONS

BECU ATM and Debit Transaction Limits, Apr. 16, 2016. Available at: https://www.becu.org/support/atm-and-debit-transaction-limits (Year: 2016).*

(Continued)

*Primary Examiner* — David P Sharvin
*Assistant Examiner* — Gregory Harper
(74) *Attorney, Agent, or Firm* — Foley & Lardner LLP

(57) ABSTRACT

A computer-implemented method includes receiving a first transaction request including a first transaction amount, determining that the first transaction amount would cause a violation of a daily spending limit, determining to apply an adaptive daily spending limit (ADSL) override, generating an approval message indicating that the first transaction request is approved based on the application of the ADSL override, transmitting the approval message to the ATM, and dispensing the first transaction amount in a currency by the ATM.

20 Claims, 3 Drawing Sheets

(56) References Cited

U.S. PATENT DOCUMENTS

| | | |
|---|---|---|
| 2002/0073046 A1 | 6/2002 | David |
| 2003/0084304 A1 | 5/2003 | Hon et al. |
| 2003/0204726 A1 | 10/2003 | Kefford |
| 2003/0218066 A1 | 11/2003 | Fernandes et al. |
| 2004/0039694 A1 | 2/2004 | Dunn et al. |
| 2005/0108130 A1 | 5/2005 | Monk |
| 2006/0016877 A1 | 1/2006 | Bonalle et al. |
| 2006/0026073 A1 | 2/2006 | Kenny et al. |
| 2007/0080207 A1 | 4/2007 | Williams |
| 2007/0145121 A1 | 6/2007 | Dallal et al. |
| 2008/0249947 A1 | 10/2008 | Potter |
| 2008/0301019 A1* | 12/2008 | Monk ............... G06Q 20/4016 705/35 |
| 2009/0050688 A1 | 2/2009 | Kon et al. |
| 2009/0106150 A1 | 4/2009 | Pelegero et al. |
| 2009/0313156 A1 | 12/2009 | Herr |
| 2010/0011222 A1 | 1/2010 | Fiske |
| 2010/0106583 A1 | 4/2010 | Etheredge et al. |
| 2010/0325044 A1* | 12/2010 | MacGuire ............. G06Q 20/40 705/42 |
| 2011/0016047 A1 | 1/2011 | Wu et al. |
| 2011/0113245 A1 | 5/2011 | Varadarajan |
| 2011/0238573 A1 | 9/2011 | Varadarajan |
| 2012/0130786 A1 | 5/2012 | Marshall |
| 2012/0323717 A1 | 12/2012 | Kirsch |
| 2012/0330824 A1 | 12/2012 | Ng et al. |
| 2013/0238497 A1 | 9/2013 | Ramachandran et al. |
| 2013/0299592 A1 | 11/2013 | Chiang |
| 2014/0074632 A1* | 3/2014 | Mateen ............. G06Q 20/4037 705/16 |
| 2014/0079219 A1 | 3/2014 | Yigit et al. |
| 2014/0081874 A1 | 3/2014 | Lewis et al. |
| 2014/0156535 A1 | 6/2014 | Jabbour et al. |
| 2014/0188723 A1 | 7/2014 | Pacher et al. |
| 2014/0214688 A1 | 7/2014 | Weiner et al. |
| 2015/0004633 A1 | 1/2015 | Sisco et al. |
| 2015/0058216 A1* | 2/2015 | Luciani ............. G06Q 20/3276 705/43 |
| 2015/0178697 A1* | 6/2015 | Rossmann ............ G07F 19/211 705/43 |
| 2015/0215310 A1 | 7/2015 | Gill et al. |
| 2015/0254655 A1* | 9/2015 | Bondesen .......... G06Q 20/3821 705/72 |
| 2016/0078430 A1* | 3/2016 | Douglas ............. G06Q 30/0185 705/43 |
| 2016/0086184 A1 | 3/2016 | Carpenter et al. |
| 2016/0162855 A1 | 6/2016 | Johnson et al. |
| 2017/0109730 A1* | 4/2017 | Locke ................... G06K 19/02 |
| 2017/0124313 A1 | 5/2017 | Frank et al. |
| 2017/0124544 A1 | 5/2017 | Recriwal et al. |
| 2017/0154328 A1* | 6/2017 | Zarakas ............. G06Q 20/204 |
| 2017/0163676 A1 | 6/2017 | Bank et al. |
| 2017/0186082 A1 | 6/2017 | Lopez et al. |
| 2017/0262829 A1 | 9/2017 | Leoni et al. |
| 2017/0308883 A1 | 10/2017 | Black |
| 2018/0047000 A1 | 2/2018 | Kuchenski et al. |
| 2018/0063303 A1 | 3/2018 | Wall et al. |
| 2018/0114207 A1 | 4/2018 | Budde et al. |
| 2018/0165663 A1 | 6/2018 | Naik et al. |
| 2018/0174119 A1 | 6/2018 | Richards et al. |
| 2018/0268398 A1* | 9/2018 | Park ................... G06Q 20/1085 |
| 2018/0308076 A1 | 10/2018 | Jeong |
| 2020/0066110 A1 | 2/2020 | Nelson et al. |

OTHER PUBLICATIONS

Symitar Credit, Debit, and ATM Solutions Guide, 2015, 8 pages Available at: symsg_creditdebitatm.pdf (Year: 2015).

Visa Check Card?, 2005, 4 pages, Available at: https://www.alliancebank.com//kcms-doc/341/744NisaCheckCardDisclosureAgreement.pdf (Year: 2005).

* cited by examiner

ADAPTIVE DAILY WITHDRAWAL LIMITS FOR SMART CHIP ATM TRANSACTIONS

CROSS-REFERENCE TO RELATED APPLICATION

This application is a continuation of U.S. patent application Ser. No. 15/818,544, entitled "ADAPTIVE DAILY WITHDRAWAL LIMITS FOR SMART CHIP ATM TRANSACTIONS," filed Nov. 20, 2017, which claims priority to U.S. Provisional Patent Application No. 62/439,309 entitled "ADAPTIVE DAILY WITHDRAWAL LIMITS FOR SMART CHIP ATM TRANSACTIONS," filed Dec. 27, 2016, each of which is incorporated herein by reference in its entirety.

TECHNICAL FIELD

The present disclosure relates generally systems and methods for applying an adaptive daily spending limit to a debit payment instrument (e.g., a debit card) having an integrated smart chip.

BACKGROUND

Financial institutions provide various ways for customers to access account information and perform transactions, such as transaction machines, websites, and brick and mortar locations (e.g., retail bank branches). Transaction machines, such as automated teller machines (ATMs), may be accessed at various geographic locations, such as bank locations, convenience stores or other stores to facilitate the account holder's interaction with banking systems. Transaction machines accept transaction cards such as debit cards, credit cards, or stored value cards (e.g., prepaid cards) that are used by account holders to purchase items or services or to obtain funds.

In order to withdraw money from a transaction machine, the transaction card typically includes one or more of a variety of types of technologies that store information used to access the associated account. For example, a payment card, such as a debit card, may include a magnetic stripe. The magnetic stripe comprises magnetic particles that can be arranged to store account information (e.g., the account holder's name, the primary account number, etc.) that can be read by a magnetic stripe reader. As another example, a payment card may include a smart chip, such as a Europay-MasterCard-Visa (EMV) chip, that is programmed with account information that is read by a chip reader. The smart chip includes an integrated circuit or microprocessing chip that is embedded in the transaction card. The EMV standard includes additional protections against fraud that result in chip cards representing a more secure option than magnetic stripe technology.

Often, financial institutions impose a daily spending limit (DSL) on the use of transaction cards. The DSL is generally intended to minimize the risk of fraudulent transactions and is often applied regardless of the balance of the account associated with the transaction card. Though the DSL may be effective in minimizing fraud and its subsequent effects, use of the DSL may also decrease customer satisfaction. For example, transactions denied due to violation of the DSL may require customers to take multiple trips to the ATM on successive days in order to obtain a desired withdrawal amount. This scenario may be particularly unwelcome when the customer has more than sufficient balance in the account to cover the desired withdrawal. Although a customer may request a higher DSL from the financial institution, this usually involves a cumbersome manual process in which the financial institution must assess the institutional risk of a higher limit for a particular customer. Accordingly, systems and methods utilizing the increased security of a smart chip to automatically implement flexible withdrawal limits would be desirable.

SUMMARY

One embodiment of the disclosure relates to a system including a network interface and a processing circuit. The processing circuit includes one or more processors coupled to non-transitory memory. The processing circuit is configured to receive a transaction request associated with a payment card. The transaction request includes a transaction amount. The processing circuit is further configured to determine that the transaction amount would cause a violation of a daily spending limit associated with the payment card. The payment card includes a smart chip. The processing circuit is additionally configured to apply an adaptive daily spending limit (ADSL) override of the daily spending limit based at least in part on a determination that the transaction request originated from the payment card having the smart chip, and approve the transaction request based on the ADSL application.

Another embodiment may be a computer-implemented method performed by a financial institution computing system. The method includes receiving a transaction request associated with a payment card. The transaction request includes a transaction amount. The method further includes determining that the transaction amount would cause a violation of a daily spending limit associated with the payment card. The payment card includes a smart chip. The method further includes applying an adaptive daily spending limit (ADSL) override of the daily spending limit based in part on a determination that the transaction request originated from the payment card having the smart chip and approving the transaction request based on the ADSL application.

A further embodiment may be a computer-implemented method performed by a financial institution computing system. The method includes receiving a withdrawal transaction request containing a withdrawal amount from an automated teller machine and determining that the withdrawal amount would cause a violation of a daily spending limit. The method further includes making an adaptive daily spending limit (ADSL) determination based on a determination that the withdrawal transaction request originated from a transaction card comprising a smart chip and a determination of a least one of an ADSL usage flag status, a balance of an account associated with the withdrawal transaction request, and a maximum ADSL limit. The method further includes completing the withdrawal transaction request based on the ADSL determination and logging an indicator value in a transaction log indicating the ADSL determination.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the Figures generally, systems and methods for applying an adaptive daily spending limit (ADSL) to a debit payment instrument (e.g., a debit card) having an integrated smart chip are described. When a debit card holder requests money from an ATM using the debit card, the withdrawal amount may be restricted because of the application of a daily spending limit (DSL) to the debit account. The DSL is an amount set by a financial institution that represents a maximum amount an account holder may utilize the debit instrument within a given day (e.g., for purchases, for cash withdrawals from an ATM, etc.). In many cases, application of the DSL is an attempt to limit fraudulent activity and the amount of the DSL bears no relationship with the account balance. However, debit cards with integrated smart chips are inherently less susceptible to fraudulent activity than debit cards that do not contain smart chips. Thus, when a debit card holder inserts a debit card containing a smart chip into an ATM and requests approval of a transaction that would otherwise violate a DSL, a financial institution may wish to apply an ADSL to the debit account that permits the completion of the withdrawal transaction. In some arrangements, an ADSL processing circuit within a financial institution computing system may run a series of checks to determine more information about the origin of the withdrawal transaction and the debit account status before determining whether to apply an ADSL to the debit instrument.

Figure 1:
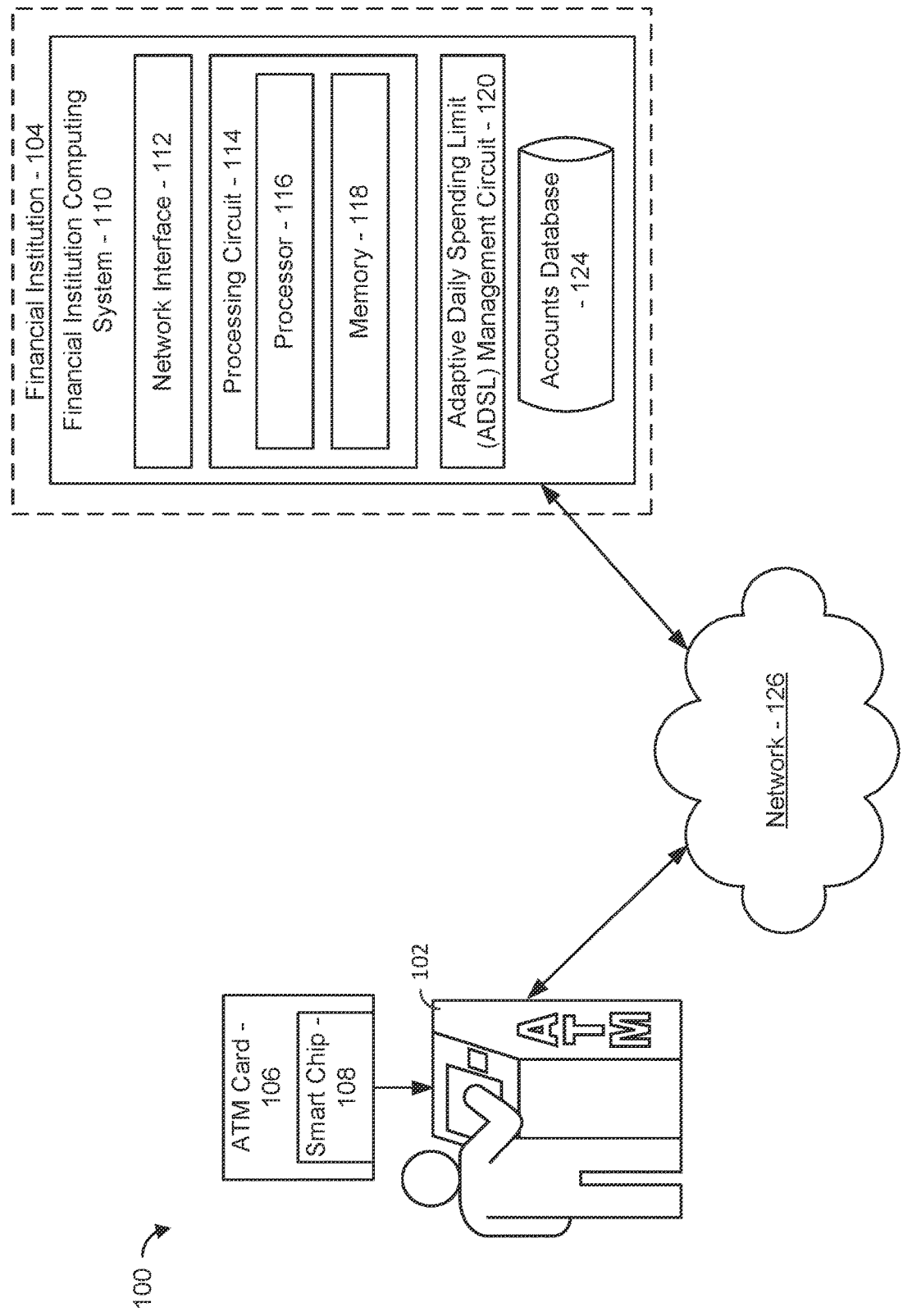
FIG. 1 is a schematic diagram of an adaptive transaction limit management system, according to an example embodiment.

Referring to FIG. 1, an adaptive transaction limit management system 100 is shown, according to an example embodiment. The management system 100 may include, among other systems, an automated teller machine (ATM) 102, and a financial institution computing system 110 within a financial institution 104. The financial institution computing system 110 may include an adaptive daily spending limit (ADSL) management circuit 120 that is integrated within, or otherwise communicable with, the financial institution computing system 110. The ATM 102 and the financial institution 104 may communicate directly or through a network 126, which may include one or more of the Internet, cellular network, Wi-Fi, Wi-Max, a proprietary banking network, or any other type of wired or wireless network.

According to an embodiment of the disclosure, the ATM 102 is a conventional ATM capable of both receiving deposits and dispensing funds. For example, the ATM 102 may be used to perform functions such as withdrawals of paper currency, deposits of paper currency and checks, and monitoring of account balances. In one embodiment, the ATM 102 is owned and operated by the financial institution 104. In other embodiments, the ATM 102 and the financial institution 104 are owned and operated by different entities (e.g., Bank A and Bank B). Account holders may choose to use ATMs owned by different financial institutions as a matter of convenience. For example, an account holder of Bank A may withdraw money from the Bank A account using an ATM owned by Bank B because Bank B's ATM is located closer to the account holder's home or workplace.

The ATM 102 includes a transaction card slot configured to receive a transaction card inserted by a user. The ATM 102 may further include a keypad, or similar user input device, containing a number of buttons (e.g., alphanumeric, etc.) configured to receive input (e.g., a personal identification number (PIN)) from a user. Additionally or alternatively, the ATM 102 may incorporate similar user input devices such as touch screens, gesture recognition, and so on. The user utilizes the user input devices, such as the keypad, to navigate a guided user interface (GUI) of the ATM 102. The GUI allows the user to perform the various functions of the ATM 102 and also display information (e.g., prompts, images, text, etc.) to the user. For example, the GUI of the ATM 102 may display account information (e.g., account balance, account number, etc.) to the user.

To initiate a transaction with the ATM 102, a user may insert an ATM card 106 into a transaction card slot of the ATM 102. The ATM card 106 may be one of several types of transaction cards, including a debit card, a credit card, a stored value card, and the like. The transaction cards may be associated with various financial instruments, including a demand deposit account and/or a line of credit. In some embodiments, data used to identify the financial instrument is stored on the ATM card 106 on at least one of a magnetic stripe and/or a smart chip 108 (e.g., an EMV chip). The magnetic stripe stores static data, including the primary account number (PAN) associated with the financial instrument as well as a static card security code. Different payment brands refer to this security code as a card verification value (CVV), card verification code (CVC), card ID (CID), or the like. Because the data is static, the magnetic stripes can be easily cloned or duplicated by thieves using skimming devices or other methods. Thus, transactions cards containing only magnetic stripes are at significant risk for fraud. Though ATM transactions have historically been more secure than point-of-sale (i.e., merchant) transactions due to the heightened security measures surrounding the use of ATMs (e.g., requirement of PIN input, security cameras), the potential for fraud involving ATMs remains, and the risk of fraudulent activity may be significantly reduced through the use of transaction cards containing smart chips.

The smart chip 108 is a secure integrated circuit chip with a microprocessor and memory that is embedded on the ATM card 106 and configured to facilitate dynamic and cryptographic authentication of account information. The microprocessor on the integrated circuit chip may store applications related to the authentication process. Unlike the static data of the magnetic stripe, every time a transaction card containing a smart chip is used, the smart chip creates a unique transaction code (i.e., distinct from the CVV, CVC, or CID stored on the magnetic stripe) that is utilized to verify a given transaction. Without the unique transaction code (or without a transaction code), the transaction based on the account number associated with the transaction card will be denied. Thus, if a thief or fraudster skims an account number associated with a transaction card having a smart chip, the account number cannot be used because the fraudster does not have access to the smart chip that generates the unique transaction code. In some embodiments, the smart chip 108 also includes a chip CVV that is unique from the magnetic stripe CVV. Transaction cards that include a smart chip 108 may alternately be known as smart cards, chip cards, smart-chip cards, chip-enabled smart cards, chip-and-choice cards, EMV smart cards, or EMV cards.

Still referring to FIG. 1, the transaction card slot of the ATM 102 is connected to a card reader. ATM card readers may operate via one of three user actions: swiping, dipping, and inserting. Swiping involves the user passing only the magnetic strip of a transaction card through a reader. Dipping involves quickly inserting and then removing the card from the card reader. Inserting involves inserting the transaction card fully into a card slot, where it is "grabbed" by the reader to remain within the terminal for the duration of the transaction. Because swiping only involves the reader making contact with the magnetic strip and dipping does not permit the reader to make contact with a smart chip for a significant length of time, neither method is suitable for reading data from a smart chip.

Once a user has inserted the ATM card 106 into the ATM 102 and the card reader mechanism has read data from the smart chip 108, the ATM 102 identifies the applications stored on the smart chip 108 and selects an appropriate application or applications to perform a preliminary risk management process. In some embodiments, the preliminary risk management process includes a data authentication process and cardholder verification checks (e.g., PIN entry). In some embodiments, the authentication and verification processes include an online card authentication process.

After the card has been authenticated, details of the withdrawal transaction and financial instrument data obtained from the smart chip 108 may be transmitted to the financial institution 104 via the network 126. In some embodiments, data transmitted to the financial institution 104 may comprise a data packet. In various embodiments, the data packet may include a cryptogram and a string of numbers in which the values of certain fields in the string comprise details about the transaction. For example, the value of one field in the string may indicate that the transaction card initiating the transaction is a smart chip (e.g., EMV) card. Other fields may indicate that the transaction was acquired at a chip-capable terminal and/or that the card data passed data and cardholder verification procedures.

The financial institution 104 is an entity that manages the financial instrument held by the account holder requesting funds from the ATM 102. For example, the financial institution 104 may be a bank, credit union, a payment services company, a financial service provider, or other similar entities. The financial institution 104 contains an associated financial institution computing system 110. The financial institution computing system 110 includes, among other systems, a network interface 112, a processing circuit 114, an adaptive daily spending limit (ADSL) management circuit 120, and an accounts database 124.

The processing circuit 114 includes a processor 116 and memory 118. The processor 116 may be implemented as one or more application specific integrated circuits (ASICs), field programmable gate arrays (FPGAs), a group of processing components, or other suitable electronic processing components. Memory 118 may be one or more devices (e.g., RAM, ROM, Flash memory, hard disk storage) for storing data and/or computer code for completing and/or facilitating the various processes described herein. Memory 118 may be or include non-transient volatile memory, non-volatile memory, and non-transitory computer storage media. Memory 118 may include database components, object code components, script components, or any other type of information structure for supporting the various activities and information structures described herein. Memory 118 may be communicably coupled to the processor 116 and include computer code or instructions for executing one or more processes described herein.

Still referring to FIG. 1, the financial institution computing system 110 is further shown to include an adaptive daily spending limit (ADSL) management circuit 120. The ADSL management circuit 120 is configured to determine whether an ADSL should be applied to an account when a withdrawal request is received from the ATM 102 that would otherwise violate a daily spending limit (DSL). The DSL is an amount set by the financial institution 104 that represents the maximum amount of currency that an account holder may utilize a transaction card for within a given day. For example, the transaction card may have a DSL of $1,000, meaning that if the account holder uses the transaction card to make a purchase for $910 and then attempts to withdraw $100 from an ATM on the same day, the ATM withdrawal transaction will be denied. In some embodiments, the DSL is determined by the financial institution 104 without reference to the balance of the account associated with the transaction card. Rigid application of the DSL may be frustrating and inconvenient to account holders, particularly when the DSL is low relative to the account balance of the financial instrument. For example, returning to the example above, the $100 ATM withdrawal transaction may be denied on the basis of exceeding the DSL even if the account holder is requesting funds from an account with a balance of $25,000.

An ADSL is an override to the DSL that may be applied to a financial instrument in response to a withdrawal transaction when the risk to the financial institution is low. For example, risk to a financial institution may be minimized when the withdrawal transaction originates from a transaction card containing a smart chip used in an ATM owned and operated by the financial institution. In some embodiments, the amount of the ADSL is configurable by the financial institution 104 based on the type of financial instrument, the account holder's transaction history with the financial institution, categorization of the account holder into a particular customer group, or any other criteria determined by the financial institution. For example, the financial institution 104 may wish to set a higher ADSL for its business customers than its regular consumers (e.g., $1,000 added to the DSL for business customers vs. $500 added to the DSL for regular consumers).

The ADSL management circuit 120 determines whether to apply an ADSL to a transaction that would otherwise be denied for violating the DSL. If the ADSL management circuit 120 determines that an ADSL should be applied, the funds requested by the transaction card holder are deducted from the account, even though the transaction would otherwise violate the DSL. If the ADSL management circuit 120 determines that an ADSL should not be applied, the transaction is cancelled. This process is described in greater detail below with respect to FIGS. 2 and 3.

The financial institution computing system 110 further includes an accounts database 124. The accounts database 124 is configured to store all information relating to the accounts associated with the transaction cards, including any information required by the ADSL management circuit 120 or the processing circuit 114. This information may include, but is not limited to, account numbers (i.e., PANs), account balance information, authentication and verification data, and transaction logs.

Figure 2:
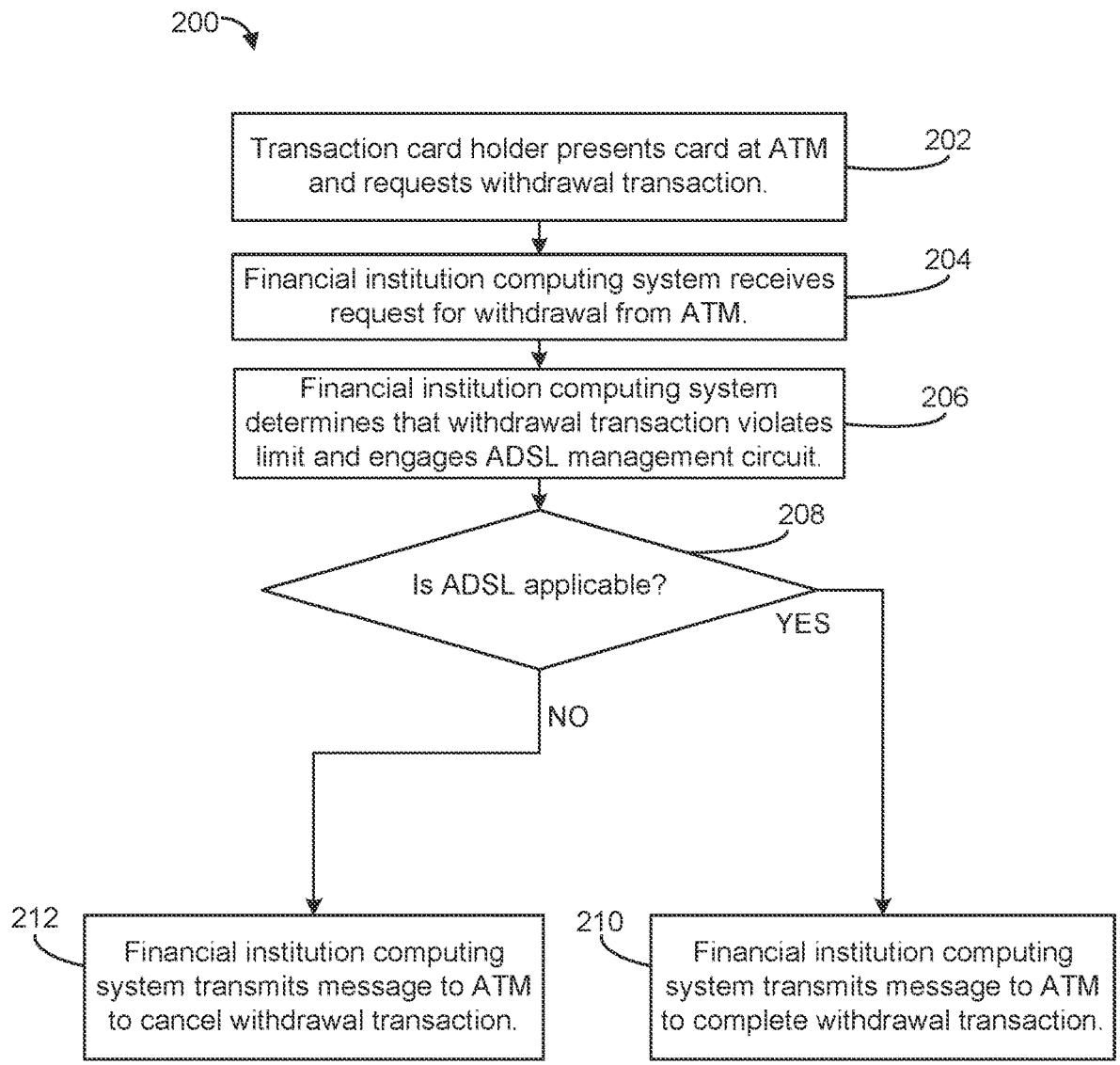
FIG. 2 is a schematic diagram of a process for adapting a transaction limit that may be implemented using the system shown in FIG. 1, according to an example embodiment.

Referring now to FIG. 2, a process 200 is shown for changing a withdrawal transaction limit via application of an ADSL, according to an example embodiment. The process 200 may be performed by the financial institution computing system 110 (e.g., by the ADSL management circuit 120) of the management system 100 shown in FIG. 1. The transaction card holder presents the transaction card 106 at ATM 102 by inserting the card into the card slot at 202. Once the card reader of the ATM 102 has obtained the account information from the card (e.g., an account number associated with the card, dynamic data stored on the smart chip 108, etc.) and after the card holder inserting the card 106 has been authenticated (e.g., by providing a PIN, by providing a biometric, etc.), the card holder is presented with a number of transaction options displayed via the user interface of the ATM 102. The card holder additionally selects a withdrawal transaction of paper currency at 202. This request may be transmitted via the network 126, and received by the financial institution computing system 110 at 204.

At 206, the financial institution computing system 110 determines that the requested withdrawal amount violates the DSL and transmits information regarding the withdrawal transaction to the ADSL management circuit 120. At 208, the ADSL management circuit 120 determines whether an ADSL should be applied to the requested withdrawal transaction. The process of determining whether an ADSL should be applied will be described in greater detail below with reference to FIG. 3. If the ADSL management circuit 120 determines an ADSL may be applied to the account associated with the withdrawal transaction, the financial institution computing system 110 transmits a message at 210 to the ATM 102 indicating that the withdrawal transaction should be approved, and process 200 terminates with ATM 102 dispensing the requested funds.

However, if the ADSL management circuit 120 determines at 208 that an ADSL should not be applied to the withdrawal transaction, the financial institution computing system 110 transmits a message to the ATM 102 at 212 indicating the withdrawal transaction should be cancelled. In some embodiments, the ATM 102 may display a message notifying the user of the reason for the cancellation. For example, the ATM 102 may display a "DAILY LIMIT EXCEEDED" message. This message may inform the transaction card holder that the transaction was not cancelled because the account contained insufficient funds or because fraudulent activity was detected on the account.

Figure 3:
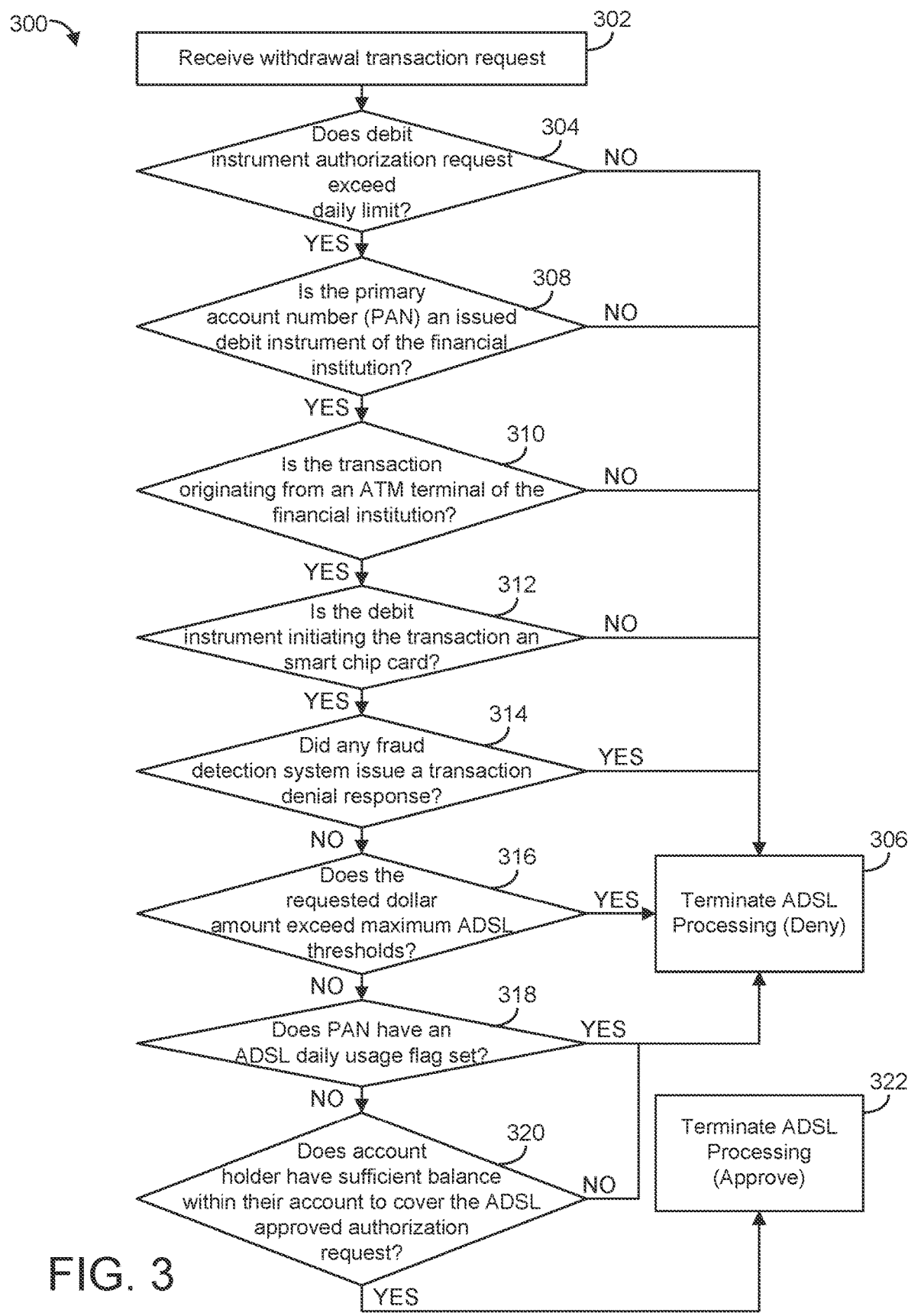
FIG. 3 is a schematic diagram of the process for adapting a transaction limit of FIG. 2 in greater detail, according to an example embodiment.

Referring now to FIG. 3, a process 300 is shown for determining whether to apply an adaptive transaction limit to a withdrawal transaction, according to an example embodiment. The process 300 may be performed using the adaptive transaction limit management system 100 shown in FIG. 1. Specifically, the process 300 may be performed using ADSL management circuit 120 of the financial institution computing system 110, which is described in further detail herein.

The ADSL management circuit 120 receives a request to evaluate a transaction for ADSL eligibility at 302. In an example embodiment, this request is received by the financial institution computing system 110 via the network 126 after a debit instrument holder inserts the ATM card 106 containing the smart chip 108 into the ATM 102 and requests a withdrawal transaction. In some embodiments, step 302 is identical or substantially similar to step 204 of the process 200.

The ADSL management circuit 120 verifies that the withdrawal transaction request would cause the debit instrument holder to exceed a daily spending limit at 304. For example, a debit instrument holder may request a $50 withdrawal from an ATM when the debit instrument holder's DSL is $500 and no other transactions involving the debit instrument have been made the same day. In this example, the financial institution computing system 110 would not decline the transaction for exceeding a DSL and there is no need to determine whether an ADSL should apply. The ADSL management circuit 120 therefore terminates ADSL processing at 306.

If the ADSL management circuit 120 terminates ADSL processing at 306, several events may subsequently occur. Depending on the circumstances of the termination, the ADSL management circuit 120 may send a transaction denial message to the processing circuit 114, and the processing circuit 114 may transmit a transaction denial message that is displayed on the ATM 102. The ADSL management circuit 120 may also set an ADSL indicator value in a transaction log to note the termination of ADSL processing. In some embodiments, the transaction log is stored in the accounts database 124 of the financial institution computing system 110. For example, the ADSL management circuit 120 may set a value of "AD" in the transaction log to indicate that ADSL processing occurred, but the transaction was denied.

Returning to an alternative example at 304, if a debit instrument holder with a $500 daily spending limit requests $50 from an ATM when the daily transactions involving the debit instrument total $475, the financial institution computing system 110 will deny the transaction on a preliminary basis, and process 300 will continue to 308. At 308, the ADSL management circuit 120 determines whether the primary account number (PAN) associated with the financial instrument is a PAN issued by the financial institution 104. For example, if Bank A (i.e., the financial institution 104) receives a withdrawal request originating at one of Bank A's ATMs involving a debit instrument with an associated PAN issued by Bank B, Bank A may have neither the authority nor the inclination to apply an ADSL to the debit instrument associated with Bank B. In this scenario, process 300 proceeds to terminate ADSL processing at step 306. However, if the debit instrument's associated PAN is also issued from Bank A, process 300 may continue to step 310.

At 310, the ADSL management circuit 120 determines whether the withdrawal transaction originated from an ATM 102 associated with the financial institution 104. In one example, Bank A (i.e., the financial institution 104) may receive a withdrawal request from a debit instrument with an associated PAN issued by Bank A, but the transaction may originate from an ATM 102 associated with Bank B. In another example, the withdrawal transaction may be received from a source other than an ATM 102 (e.g., a merchant point-of-sale (POS) terminal). If the ADSL management circuit 120 determines that the withdrawal transaction originated from a source other an ATM 102 associated with the financial institution 104, process 300 terminates at 306. However, if the ADSL management circuit 120 determines that the transaction did originate from an ATM 102 associated with the financial institution 104, process 300 may proceed to 312.

Still referring to FIG. 3, at 312, the ADSL management circuit 120 verifies that the debit instrument initiating the transaction is a smart chip card. As described above with reference to FIG. 1, in some embodiments, the value of one field in the string of the data packet transmitted to the financial institution computing system 110 from the ATM 102 may indicate that the transaction card initiating the transaction is an integrated chip (e.g., EMV) card. Other fields may indicate that the transaction was acquired at a chip-capable terminal and/or that the card data passed authorization procedures. If the ADSL management circuit 120 verifies the debit instrument initiating the transaction is a smart chip card, process 300 continues to 314. If the debit instrument is not a smart chip card, process 300 terminates at 306 because non-chip card transactions are inherently less secure than smart chip transactions (e.g., the transaction may have been initiated by a fraudster using skimmed card data).

At 314, the ADSL management circuit 120 determines whether any fraud detection system within the financial institution computing system 110 has denied the transaction. In some embodiments, fraud detection may be based on a comparison of the geographic location associated with the account stored in the accounts database 124 and the geographic location of the ATM 102 requesting the withdrawal transaction. For example, if an account holder opens and primarily uses an account in geographic region A and the financial institution computing system 110 detects that the withdrawal transaction originates in geographic B, if geographic region B is a significant distance from geographic region A (e.g., different states or countries), the withdrawal transaction may be flagged as potentially fraudulent. In other embodiments, fraud may be detected if transactions prior to the requested withdrawal transaction are highly uncharacteristic when compared with the financial instrument's past patterns of usage. If the ADSL management circuit 120 determines that a fraud detection system has denied the transaction, process 300 terminates at 306. Alternatively, if no system within the financial institution computing system 110 has detected fraud, process 300 will continue to 316.

Referring now to 316 of the process 300, the ADSL management circuit 120 determines whether the requested withdrawal transaction amount exceeds maximum ADSL thresholds. In some embodiments, the amount requested by the account holder exceeds both the DSL and the permitted amount when an ADSL is applied. For example, if the DSL for a financial instrument is $1,000, and the ADSL set by the financial institution 104 for this type of financial instrument is $500, application of an ADSL to the DSL would not be suitable if the account holder requests a withdrawal transaction of $2,000. Thus, if the amount of the withdrawal transaction exceeds the amount permitted by an applied ADSL, process 300 terminates at 306. If the withdrawal amount does not exceed the limits of the ADSL, process 300 continues to 318.

At 318, the ADSL management circuit 120 determines whether the PAN associated with the transaction has a ADSL flag set indicating that an ADSL has been applied. The ADSL flag may be used to limit the frequency in which an ADSL is applied to an account (e.g., once per day). In some embodiments, the ADSL daily usage flag comprises a value (e.g., "0" if no ADSL has been applied to the account, "1" if an ADSL has been applied once) in the account data packet transmitted from the ATM 102 to the financial institution computing system 110. In some embodiments, multiple applications of an ADSL in a single day may be permitted by financial institution 104, and the value of the ADSL daily usage flag may be incremented each time an ADSL is applied.

If the ADSL management circuit 120 determines from the ADSL daily usage flag that an ADSL has already been applied to a prior transaction on the day of the withdrawal request, process 300 terminates at 306. In some embodiments, terminating the process at this step includes the ADSL management circuit 120 logging an indicator (e.g., "AE") in the transaction log to indicate that the transaction used ADSL logic, but the withdrawal transaction was denied because the daily usage flag was already set. If the ADSL management circuit 120 detects that the ADSL daily usage flag is not set in the account data received from the ATM 102, the process 300 continues to 320. Alternatively, if the value of the ADSL daily usage flag does not exceed the limit imposed by the financial institution 104, process 300 may also proceed to 320.

At 320, the ADSL management circuit 120 determines whether the account holder has sufficient balance within the account to cover the requested amount if an ADSL was applied to the withdrawal transaction. For example, if the financial institution 104 has a default ADSL of $500 and an account holder requests a withdrawal of $400, the transaction will be denied if the account balance is only $300, even though the requested withdrawal of $400 is within the $500 ADSL. If the ADSL management circuit 120 determines that the account contains insufficient funds to complete the withdrawal transaction, process 300 proceeds to terminate at 306. However, if the account has sufficient balance to cover the requested transaction, process 300 proceeds to 322.

At 322, ADSL processing is terminated with a determination to approve the withdrawal amount via application of an ADSL to the financial instrument associated with the withdrawal transaction. Approval of the ADSL causes the ADSL management circuit 120 to generate an approval message that is transmitted to the financial institution computing system 110, which in turn transmits an approval to the ATM 102 via the network 126. After the ATM 102 receives the approval message, it dispenses the requested funds as described with reference to 210 above. Approval of the ADSL may also prompt the management circuit 120 to set or increment the value of the ADSL daily usage flag in the account data. In some embodiments, the management circuit 120 may additionally or alternatively set an indicator value in the transaction log (e.g., "AA") to identify that the transaction utilized ADSL processing and an ADSL was applied to the account to complete the transaction.

In some embodiments, ADSL management circuit 120 may not complete each of the checks detailed in 304-320 of process 300 in determining whether to apply an ADSL. For example, ADSL management circuit 120 may omit one or two of the checks detailed in 304-320 (e.g., if financial institution 104 deems the risk of fraud to be low, ADSL management circuit 120 may bypass the fraud detection check in 314). In other embodiments, ADSL management circuit 120 may omit nearly all of the checks detailed in 304-320. For example, financial institution 104 may determine that it is sufficient to perform a bare minimum of checks (e.g., only checking whether the debit instrument is a smart chip card at 312 and whether the account holder has sufficient balance to cover the ADSL at 320) before determining whether to apply an ADSL.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method comprising:
   receiving, by a processing circuit of a financial institution computing system, a first data packet comprising a first transaction request associated with a payment card from an automated teller machine (ATM) associated with a financial institution associated with the payment card, the first data packet including a value in a field of a string indicating that the payment card is a smart chip card, the first transaction request including a first transaction amount;
   determining, by the processing circuit, that the first transaction amount would cause a violation of a daily spending limit associated with the payment card based on the first transaction amount;
   transmitting, by the processing circuit, first transaction information regarding the first transaction request to an adaptive daily spending limit (ADSL) circuit of the financial institution computing system;
   determining, by the ADSL circuit, that the first transaction request originated from the ATM associated with the financial institution associated with the payment card;
   determining, by the ADSL circuit, that the payment card is the smart chip card based on the value in the field of the string of the first data packet;
   determining, by the ADSL circuit, that no fraud detection system has denied the first transaction request;
   determining, by the ADSL circuit, that the first transaction amount does not exceed a maximum ADSL threshold;
   determining, by the ADSL circuit, that an ADSL usage flag does not exceed an ADSL usage flag limit, the ADSL usage flag permitting multiple ADSL usages in a single day;
   determining, by the ADSL circuit, that an account holder associated with the payment card has a sufficient balance to cover the first transaction amount;
   determining, by the ADSL circuit, to apply an ADSL override based on the determinations that the first transaction request originated from the ATM associated with the financial institution associated with the payment card, that the payment card is the smart chip card, that no fraud detection system has denied the first transaction request, that the first transaction amount does not exceed the maximum ADSL threshold, that the ADSL usage flag does not exceed the ADSL usage flag limit, and that the account holder has the sufficient balance;
   applying, by the ADSL circuit, the ADSL override of the daily spending limit in response to determining to apply the ADSL override, wherein applying the ADSL override increases the daily spending limit by an ADSL amount;
   generating, by the ADSL circuit, an approval message indicating that the first transaction request is approved based on the application of the ADSL override;
   transmitting, by the ADSL circuit, the approval message to the processing circuit;
   transmitting, by the processing circuit, the approval message to the ATM; and
   subsequent to receiving the approval message, dispensing, by the ATM, the first transaction amount in a currency.

2. The computer-implemented method of claim 1, further comprising determining one or more checks to perform based on a risk of fraud associated with the first transaction request, wherein determining the one or more checks to perform comprises:
  identifying, by the financial institution computing system, a plurality of checks that are available to determine whether to apply the ADSL override; and
  omitting, by the financial institution computing system, at least one of the plurality of checks based on the risk of fraud with the first transaction request to generate the one or more checks.

3. The computer-implemented method of claim 1, wherein the ADSL amount is determined based on a customer group of the account holder of an account associated with the first transaction request.

4. The computer-implemented method of claim 1, wherein applying the ADSL override of the daily spending limit is further based in part on a detection of fraudulent activity on an account associated with the first transaction request.

5. The computer-implemented method of claim 1, further comprising:
  determining, by the ADSL circuit, the ADSL amount based on at least one of a type of the payment card or an account history associated with the payment card.

6. The computer-implemented method of claim 1, further comprising:
  incrementing, by the ADSL circuit, a value of the ADSL usage flag associated with the payment card based on the approval of the first transaction request.

7. The computer-implemented method of claim 6, further comprising:
  subsequent to incrementing the value of the ADSL usage flag, receiving, by the processing circuit, a second transaction request associated with the payment card;
  transmitting, by the processing circuit, the second transaction request to the ADSL circuit;
  determining, by the ADSL circuit, that the ADSL usage flag does not exceed the ADSL usage flag limit; and
  approving, by the ADSL circuit, the second transaction request based on the determination that the ADSL usage flag does not exceed the ADSL usage flag limit.

8. A computer-implemented method comprising:
  receiving, by a processing circuit of a financial institution computing system, a first data packet comprising a first withdrawal transaction request associated with a transaction card from an automated teller machine (ATM) associated with a financial institution associated with the transaction card, the first data packet including a value in a field of a string indicating that the transaction card is a smart chip card, the first withdrawal transaction request containing a first withdrawal amount;
  determining, by the processing circuit, that the first withdrawal amount would cause a violation of a daily spending limit associated with the transaction card based on the first withdrawal amount;
  transmitting, by the processing circuit, first withdrawal transaction information regarding the first withdrawal transaction request to an adaptive daily spending limit (ADSL) circuit of the financial institution computing system;
  determining, by the ADSL circuit, that the first withdrawal transaction request originated from the ATM associated with the financial institution associated with the transaction card;
  determining, by the ADSL circuit, that the transaction card is the smart chip card based on the value of the field of the string of the first data packet;
  determining, by the ADSL circuit, that no fraud detection system has denied the first withdrawal transaction request;
  determining, by the ADSL circuit, that the first withdrawal amount does not exceed a maximum ADSL threshold;
  determining, by the ADSL circuit, that an ADSL usage flag does not exceed an ADSL usage flag limit;
  determining, by the ADSL circuit, that an account holder associated with the transaction card has a sufficient balance to cover the first withdrawal amount;
  determining, by the ADSL circuit, to apply an ADSL override based on the determinations that the first withdrawal transaction request originated from the ATM associated with the financial institution associated with the transaction card, that the transaction card is the smart chip card, that no fraud detection system has denied the first withdrawal transaction request, that the first withdrawal amount does not exceed the maximum ADSL threshold, that the ADSL usage flag does not exceed the ADSL usage flag limit, and that the account holder has the sufficient balance;
  applying, by the ADSL circuit, the ADSL override of the daily spending limit to the first withdrawal transaction request in response to determining to apply the ADSL override, wherein applying the ADSL override increases the daily spending limit by an ADSL amount;
  generating, by the ADSL circuit, an approval message indicating that the first withdrawal transaction request is approved based on the application of the ADSL override;
  transmitting, by the ADSL circuit, the approval message to the processing circuit;
  transmitting, by the processing circuit, the approval message to the ATM;
  subsequent to receiving the approval message, dispensing, by the ATM, the first withdrawal amount in a currency; and
  logging, by the financial institution computing system, an indicator value in a transaction log indicating the determination to apply the ADSL override.

9. The computer-implemented method of claim 8, further comprising determining one or more checks to perform based on a risk of fraud associated with the first withdrawal transaction request, wherein determining the one or more checks to perform comprises:
  identifying, by the financial institution computing system, a plurality of checks that are available to determine whether to apply the ADSL override; and
  omitting, by the financial institution computing system, at least one of the plurality of checks based on the risk of fraud with the first withdrawal transaction request to generate the one or more checks.

10. The computer-implemented method of claim 8, wherein the ADSL amount is determined based on a customer group of the account holder of an account associated with the first withdrawal transaction request.

11. The computer-implemented method of claim 8, wherein applying the ADSL override of the daily spending limit is further based in part on a detection of fraudulent activity on an account associated with the first withdrawal transaction request.

12. The computer-implemented method of claim 8, further comprising:

determining, by the ADSL circuit, the ADSL amount based on at least one of a type of the transaction card or an account history associated with the transaction card.

13. The computer-implemented method of claim 8, further comprising:
incrementing, by the ADSL circuit, a value of the ADSL usage flag associated with the transaction card based on the approval of the first withdrawal transaction request.

14. The computer-implemented method of claim 13, further comprising:
subsequent to incrementing the value of the ADSL usage flag, receiving, by the processing circuit, a second withdrawal transaction request associated with the transaction card;
transmitting, by the processing circuit, the second withdrawal transaction request to the ADSL circuit;
determining, by the ADSL circuit, that the ADSL usage flag does not exceed the ADSL usage flag limit; and
approving, by the ADSL circuit, the second withdrawal transaction request based on the determination that the ADSL usage flag does not exceed the ADSL usage flag limit.

15. A system comprising:
a network interface; and
a processing circuit comprising one or more processors coupled to one or more memories having instructions stored thereon that, when executed by the one or more processors, cause the one or more processors to:
receive a first data packet comprising a first transaction request associated with a payment card from an automated teller machine (ATM) associated with a financial institution associated with the payment card, the first data packet including a value in a field of a string indicating that the payment card is a smart chip card, the first transaction request including a first transaction amount;
determine that the first transaction amount would cause a violation of a daily spending limit associated with the payment card based on the first transaction amount;
transmit first transaction information regarding the first transaction request to an adaptive daily spending limit (ADSL) circuit;
receive an approval message from the ADSL circuit; and
transmit the approval message to the ATM to initiate a dispensing of the first transaction amount in a currency; and
the ADSL circuit comprising one or more ADSL processors coupled to one or more ADSL memories having ADSL instructions stored thereon that, when executed by the one or more ADSL processors, cause the one or more ADSL processors to:
determine that the first transaction request originated from the ATM associated with the financial institution associated with the payment card;
determine that the payment card is the smart chip card based on the value in the field of the string of the first data packet;
determine that no fraud detection system has denied the first transaction request;
determine that the first transaction amount does not exceed a maximum adaptive daily spending limit (ADSL) threshold;
determine that an ADSL usage flag does not exceed an ADSL usage flag limit, the ADSL usage flag permitting multiple ADSL usages in a single day;
determine that an account holder associated with the payment card has a sufficient balance to cover the first transaction amount;
determine to apply an ADSL override based on the determinations that the first transaction request originated from the ATM associated with the financial institution associated with the payment card, that the payment card is the smart chip card, that no fraud detection system has denied the first transaction request, that the first transaction amount does not exceed the maximum ADSL threshold, that the ADSL usage flag does not exceed the ADSL usage flag limit, and that the account holder has the sufficient balance;
apply the ADSL override of the daily spending limit in response to determining to apply the ADSL override, wherein applying the ADSL override increases the daily spending limit by an ADSL amount;
generate the approval message indicating that the first transaction request is approved based on the application of the ADSL override; and
transmit the approval message to the processing circuit.

16. The system of claim 15, wherein the ADSL instructions, when executed by the one or more ADSL processors, further cause the one or more ADSL processors to:
determine one or more checks to perform based on a risk of fraud associated with the first transaction request, wherein determining the one or more checks to perform comprises:
identifying a plurality of checks that are available to determine whether to apply the ADSL override; and
omitting at least one of the plurality of checks based on the risk of fraud with the first transaction request to generate the one or more checks.

17. The system of claim 15, wherein the ADSL amount is determined based on a customer group of the account holder of an account associated with the first transaction request.

18. The system of claim 15, wherein applying the ADSL override of the daily spending limit is further based in part on a detection of fraudulent activity on an account associated with the first transaction request.

19. The system of claim 15, wherein the ADSL instructions, when executed by the one or more ADSL processors, further cause the one or more ADSL processors to:
determine the ADSL amount based on at least one of a type of the payment card or an account history associated with the payment card.

20. The system of claim 15, wherein the ADSL instructions, when executed by the one or more ADSL processors, further cause the one or more ADSL processors to:
increment a value of the ADSL usage flag associated with the payment card based on the approval of the first transaction request.

* * * * *